E. L. FLORY & B. M. OSBUN.
AIR MOISTENING DEVICE.
APPLICATION FILED AUG. 2, 1915.
1,190,395.
Patented July 11, 1916.
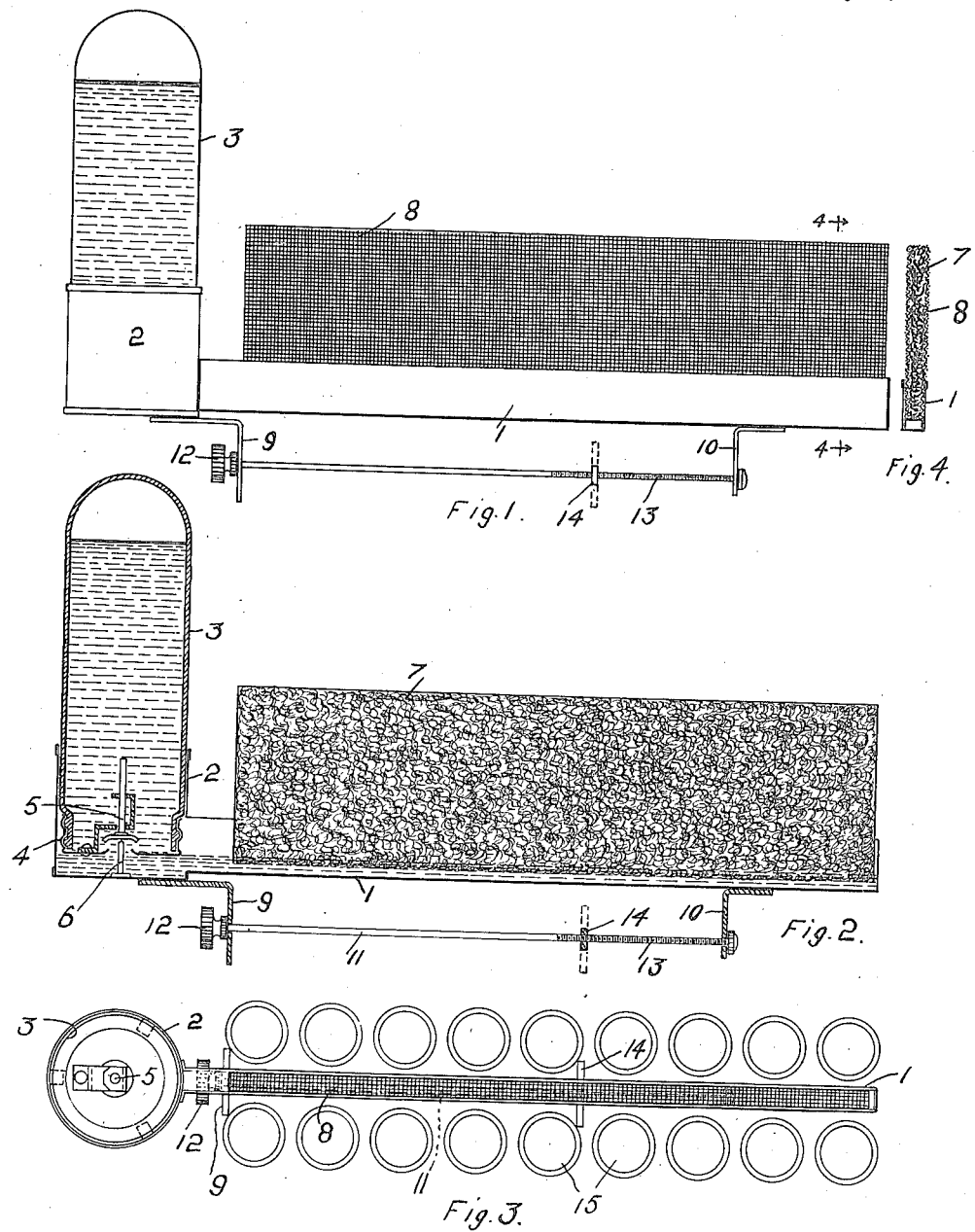
INVENTORS:
E L Flory
B. M. Osbun
BY
Chamberlin Freudenreich
ATTORNEYS.

UNITED STATES PATENT OFFICE.

EDGAR L. FLORY AND BENJAMIN M. OSBUN, OF CHICAGO, ILLINOIS.

AIR-MOISTENING DEVICE.

1,190,395.

Specification of Letters Patent.

Patented July 11, 1916.

Application filed August 2, 1915. Serial No. 43,083.

*To all whom it may concern:*

Be it known that we, EDGAR L. FLORY and BENJAMIN M. OSBUN, citizens of the United States, residing at Chicago, county of Cook, State of Illinois, have invented a certain new and useful Improvement in Air-Moistening Devices, and declare the following to be a full, clear, and exact description of the same, such as will enable others skilled in the art to which it pertains to make and use the same, reference being had to the accompanying drawings, which form a part of this specification.

Our invention has for its object to produce a neat and simple air moistening attachment for radiators which will permit any desired rate of evaporation to be obtained.

A further object of our invention is to produce a simple and novel air moistening attachment for radiators having a detachable reservoir for the water so that the water supply may be replenished conveniently without disturbing the evaporating pan.

A further object of our invention is to produce a simple and novel air moistening device having a large evaporating surface and means for automatically supplying large quantities of water to such surface without requiring a large evaporating pan.

The various features of novelty whereby our invention is characterized will hereinafter be pointed out with particularity in the claims; but, for a full understanding of our invention and of its objects and advantages, reference may be had to the following detailed description taken in connection with the accompanying drawing, wherein:

Figure 1 is a side elevation of a device arranged in accordance with a preferred form of our invention; Fig. 2 is a vertical section taken in a plane parallel with the plane of Fig. 1; Fig. 3 is a top plan view of the device attached to a radiator; and Fig. 4 is a section taken approximately on line 4—4 of Fig. 1.

Referring to the drawing, 1 represents a long narrow pan or trough terminating at one end in a cup shaped head, 2. Supported within the member 2 is an inverted container, 3, of any suitable material, although preferably of glass so that it will serve as a gage. The container is of considerable capacity and is preferably provided with a lid or cover, 4, containing an outwardly closing valve, 5. In the bottom of the member 2 is a post, 6, adapted to engage with the valve 5 when the container is placed in condition in the device, and open the valve so as to let water flow from the container into the pan, the flow continuing until the water in the pan forms a seal for the mouth of the container or reservoir. Arranged on edge in the pan is a porous pad, 7, having a length approximately equal to the length of the pan, a thickness such as to permit it to be inserted into the pan, and a height or depth considerably greater than that of the pan so that it will project above the top of the latter. The pad is preferably made of some fireproof material and is also preferably inclosed in a sheathing, 8, of wire gauze. On the under side of the pan are two downwardly projecting brackets, 9 and 10, between which extends a rod, 11, journaled therein so as to be free to rotate and be held against lengthwise movement; the rod having on the end adjacent to the receptacle 2 a head or button, 12, by which it may be turned. At least a portion of the rod, between the two brackets, is screw threaded as indicated at 13 and on this screw threaded portion is arranged a nut in the form of a flat bar considerably longer than the width of the pan.

The parts are so proportioned that the pan with its pad will slip easily between the coils of the most common forms of radiators, so that when the device is placed in position on a radiator all of it, except the water container and the supporting member 2 for the latter will be concealed. The bracket 10 is made of a width not greater than the width of the pan while the bracket 9 is made wide enough to serve as a stop for limiting the entrance of the device into the space between the coils of a radiator. This also permits the bracket 9 to coöperate with the member 14 for the purpose of fastening the device in place; the member 14 being adjusted on the rod 11 as indicated in Fig. 3, so that it will come between the two corresponding pipes or tubes on opposite sides of the radiator, so that when the member 14 is swung around into its transverse position after the device has been inserted into the radiator, the turning of the rod 11 by means of the button or head 12 in the proper direction draws the member 14 toward the bracket 9 so that these two members serve as the jaws of a clamp which grip between them the intervening portion of the radiator.

It will be seen that the container or reservoir 3 serves as an automatic fountain to maintain a constant liquid level in the pan, so that no matter how rapidly the water is evaporated from the pad its place will always be taken by a new supply. When the container is lifted out, the valve therein automatically closes so as to prevent spilling of the water and, when the filled container is inserted in the cup shaped receiver the valve is automatically opened, as heretofore explained. It will be seen that the rate of evaporation does not depend upon the width or depth of the pan but simply on the exposed surface of the wick-like pad; these surfaces being close to the radiating surfaces of the radiator coils 15 and, ordinarily, being in physical contact therewith, either directly or through the intervention of the wire gauze. It will be seen that the gauze serves to hold the pad material against distortion which would be apt to happen when it became wet and it also serves as a protection for the pad and as a heat conductor whereby heat reaches the moisture in the pad not only through radiation but also through conduction.

If desired, the water in the container may contain substances having medicinal properties so that when the water is evaporated, beneficent vapors will be spread throughout the room. In this way the device serves not only as an air moistening device but also as a means for purifying the air or impregnating it more or less with substances having either the property of preventing illness or of curing it.

While we have illustrated and described with particularity only a single preferred form of our invention, we do not desire to be limited to the exact structural details thus illustrated and described; but intend to cover all forms and arrangements which come within the terms employed in the definitions of our invention constituting the appended claims.

We claim:

1. In a device of the character described, a long, shallow, narrow pan of a width such as to permit the pan to be inserted between the coils of a radiator, a thick porous pad seated within the pan and projecting a considerable distance above the same, the pad being rigid enough to remain upright between the radiator coils between which the device is inserted, and means for securing the pan between the coils of a radiator.

2. In a device of the character described, a long, narrow pan, brackets projecting downwardly from the under side of the pan, a screw threaded rod lying between and revolubly supported by said brackets, one of said brackets being considerably wider than the pan, and an elongated nut arranged on the screw threaded portion of the rod between the brackets, the length of the nut being considerably greater than the width of the pan.

In testimony whereof, we sign this specification.

EDGAR L. FLORY.
BENJAMIN M. OSBUN.